United States Patent
Graybeal et al.

(10) Patent No.: US 10,609,634 B2
(45) Date of Patent: Mar. 31, 2020

(54) ACCESS NETWORK SELECTION

(71) Applicant: Cisco Technology, Inc., San Jose, CA (US)

(72) Inventors: John M. Graybeal, Califon, NJ (US); Ben Bleichman, Louisville, CO (US); Bart Brinckman, Nevele (BE); Konstantin Livanos, Naperville, IL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/853,801

(22) Filed: Dec. 24, 2017

(65) Prior Publication Data

US 2019/0200283 A1    Jun. 27, 2019

(51) Int. Cl.
| | | |
|---|---|---|
| *H04W 48/18* | (2009.01) | |
| *H04W 12/06* | (2009.01) | |
| *H04W 48/20* | (2009.01) | |
| *H04W 72/08* | (2009.01) | |
| *H04W 48/16* | (2009.01) | |
| *H04W 12/00* | (2009.01) | |

(Continued)

(52) U.S. Cl.
CPC ......... *H04W 48/18* (2013.01); *H04W 12/003* (2019.01); *H04W 12/06* (2013.01);
(Continued)

(58) Field of Classification Search
CPC ... H04W 48/18; H04W 48/16; H04W 72/085; H04W 12/06; H04W 48/20; H04W 72/0413; H04W 48/14; H04W 8/18; H04W 28/0268; H04W 84/12; H04W 88/06; H04B 5/00; H04B 17/3118; H04J 3/1694;
(Continued)

(56) References Cited

U.S. PATENT DOCUMENTS 8,565,766 B2 * 10/2013 Scherzer ............... H04W 72/02
455/432.3
9,083,775 B2 * 7/2015 Gupta ................... H04L 5/0057
(Continued)

FOREIGN PATENT DOCUMENTS

| WO | 2009149761 | 12/2009 |
|---|---|---|
| WO | 2015065267 | 5/2015 |
| WO | 2017/128270 A1 | 8/2017 |

OTHER PUBLICATIONS

Copeland, Rebecca et al.; Selecting Access Network for BYOD Enterprises With Business Context (EBC) and Enterprise-Centric ANDSF, Mobilware 2012 (Lecture Notes, Institute for Computer Sciences, vol. 65. Springer, Berlin, Heidelberg).

(Continued)

*Primary Examiner* — Man U Phan (57) ABSTRACT

In one embodiment, an enterprise network includes: at least one wireless access point operative to enable a wireless device to connect to the enterprise network, networked resources to be accessed by the wireless device, and a network selection server implemented on at least one computing device and operative to: authenticate credentials provided by the wireless device when connecting to the enterprise network via the at least one wireless access point, and provide network access selection policies to the wireless device, where the network access selection policies at least determine access by the wireless device to network resources while said wireless device is connected to said enterprise network.

20 Claims, 10 Drawing Sheets

(51) Int. Cl.
  *H04L 29/06* (2006.01)
  *H04W 84/12* (2009.01)
(52) U.S. Cl.
  CPC ........... *H04W 48/16* (2013.01); *H04W 48/20* (2013.01); *H04W 72/085* (2013.01); *H04L 63/0815* (2013.01); *H04W 12/004* (2019.01); *H04W 84/12* (2013.01)
(58) Field of Classification Search
  CPC .. H04J 11/0086; H04L 1/1812; H04L 1/1864; H04L 5/0035; H04L 5/0055; H04L 5/0057; H04L 5/0073; H04L 5/14; H04L 41/5032; H04L 65/60; H04L 65/602; H04L 65/608; H04L 67/10; H04L 67/02
  USPC .................................. 370/235–329
  See application file for complete search history.

(56) References Cited

U.S. PATENT DOCUMENTS

| | | | | |
|---|---|---|---|---|
| 9,264,450 | B2* | 2/2016 | Low | H04L 63/20 |
| 9,414,307 | B2* | 8/2016 | Vrbaski | H04W 48/18 |
| 9,497,740 | B2* | 11/2016 | Gupta | H04W 52/0209 |
| 9,510,388 | B1* | 11/2016 | Gegout | H04W 76/23 |
| 9,681,362 | B2* | 6/2017 | Rune | H04W 48/06 |
| 9,924,401 | B2* | 3/2018 | Gupta | H04W 36/0083 |
| 9,949,202 | B2* | 4/2018 | Navas Cornejo | H04W 48/14 |
| 10,051,533 | B2* | 8/2018 | Fitzpatrick | H04W 48/18 |
| 2014/0092731 | A1 | 4/2014 | Gupta | |
| 2015/0173008 | A1 | 6/2015 | Siddam | |
| 2015/0215832 | A1 | 7/2015 | Fitzpatrick | |
| 2015/0281998 | A1* | 10/2015 | Joly | H04W 48/14 370/235 |
| 2015/0327153 | A1* | 11/2015 | Tervonen | H04W 48/08 370/235 |
| 2016/0192289 | A1 | 6/2016 | Visuri et al. | |
| 2016/0269988 | A1* | 9/2016 | Li | H04W 48/14 |

OTHER PUBLICATIONS

Wolfe, Paul; Cisco's Mobility Management Now Includes Cellular Data (Nov. 15, 2016).
International Search Report and Written Opinion in counterpart International Application No. PCT/US2018/065987, dated Mar. 21, 2019, 17 pages.

* cited by examiner

ACCESS NETWORK SELECTION

TECHNICAL FIELD

The present disclosure generally relates to the implementation of enterprise driven policies for network access in an enterprise network.

BACKGROUND OF THE INVENTION

Most wireless devices (also referred to herein as "user equipments", or "UEs") support multiple access technologies. For example, smartphones typically support cellular, e.g., $3^{rd}$ Generation Partnership Project (3GPP), $3^{rd}$ Generation (3G), and $4^{th}$ Generation (4G), etc. as well as other technologies such as Wi-Fi (IEEE 802.11), Bluetooth, etc. Other device types, such as Internet of Things (IoT) devices, may support cellular (e.g., NB-IoT) and/or other technologies such as Wi-Fi, Bluetooth, etc. Consequently, the device may be operative to select which wireless access technology (or technologies) to attach to from the multiple wireless technologies and/or wireless network providers available at a specific location and time.

3GPP LTE provides an optional standard for access network discovery and selection function (ANDSF) which is expected to be included in the policy control function (PCF) in the standards for 5G. The network features of this standard include a defined control plane functional element called an ANDSF server which is accessible over the Gi interface. The defined reference point in the 3GPP standard is S14. A defined ANDSF client function is used by a device to access the ANDSF server. This client function may be either provided natively as an integrated component of the device's operating system (OS) and/or as a software client which is on the device by a service provider, employer's IT department, or by the user. Enforcement of ANDSF-based policies may take into account external data associated with the device's operating environment, such as, for example: location, network identifiers (e.g., SSID, etc.), connectivity conditions, time of day, applications, etc.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Overview

An enterprise network includes: at least one wireless access point operative to enable a wireless device to connect to the enterprise network, networked resources to be accessed by the wireless device, and a network selection server implemented on at least one computing device and operative to: authenticate credentials provided by the wireless device when connecting to the enterprise network via the at least one wireless access point, and provide network access selection policies to the wireless device, where the network access selection policies at least determine access by the wireless device to network resources while said wireless device is connected to said enterprise network.

A wireless device includes: processing circuitry, at least one input/output (I/O) module operative to connect the wireless device to at least one mobile service provider network and at least one enterprise network, and a network selection client application operative to be executed by the processing circuitry to employ an enterprise-centric network access selection policy when the wireless device accesses the at least one enterprise network.

DETAILED DESCRIPTION OF EXAMPLE EMBODIMENTS

Today, most wireless devices support multiple access technologies. For example, smartphones typically support cellular (e.g., 3GPP 3G & 4G, etc.) as well as other technologies such as Wi-Fi (802.11), Bluetooth, etc. Other types of wireless devices, such as Internet-of-Things (IoT) devices, may support cellular (e.g., NB-IoT) plus other technologies such as Wi-Fi, Bluetooth, etc. A wireless device may therefore typically select from among multiple wireless access technologies when attaching to access networks that may be available at a given specific location and time. Ideally, the device would select the best available technology and/or service provider. However, there are many factors that influence a device's network selection, e.g., device applications, network load or conditions, cost considerations, user profile, etc.

In practice today, on a cellular network, the service provider that issues the device identifier (e.g., subscriber identity module—"SIM") is effectively in control of setting the policy with regard to how the device determines which access technology to use, such as, for example, what radio frequency (RF) conditions or signal thresholds may be used, the present location of the device, the network identifiers of the serving and candidate network, the application, etc. Accordingly, even when attaching to a technology not provided by the service provider, e.g., a third party Wi-Fi network, the device's settings, typically set by the service provider, dictate the conditions under which the device may handover from cellular to Wi-Fi (or vice-versa) as well as which Wi-Fi networks to prioritize, and according to what criteria. As a further complication, each device manufacturer may have different implementations for the default conditions for inter-technology handovers.

For example, a business or enterprise may provide wireless service (e.g., Wi-Fi and/or one or more other access technologies) for its employees and guests. But service from one or more cellular technologies may also be present on premises; radio frequency (RF) signals provided by one or more service providers (SPs) may leak into the business location. As a result, devices in this nominally private realm have the option of choosing between wireless services provided by the enterprise wireless network or the service provider network. As a consequence, some users (whose devices connect to the SP network) may not have access to certain applications and/or other services which the private business provides as part of its wireless service. It will be appreciated that in such circumstances, it may be preferable for the enterprise to dictate network selection policy for wireless devices for devices brought into its premises. The enterprise would be able to set enterprise-centric network selection policies, i.e., policies which are appropriate to the local (enterprise) network conditions. Using network selection policies provided by the enterprise would enable devices to connect to the appropriate network for enterprise applications, thereby providing a smoother and more rewarding experience when on enterprise premises.

Furthermore, many enterprises allow employees to bring their own mobile devices (likely from multiple device vendors and using more than one service provider) to work, often for use as their "work device." It will be appreciated that it would be preferable that all such work devices connect in the same way, to the same network, thereby enabling the enterprise to more securely control and/or grant access to enterprise applications on the selected network(s), providing an added level of uniformity and/or manageability to the enterprise's network security policies for protecting critical information. However, if the service provider or manufacturer default policies control network selection, it may not be possible to implement an enterprise-centric network selection policy.

It will be appreciated that ANDSF may not be designed to provide an enterprise-centric network selection policy. For example, the enterprise's employees and guests may be served by multiple service providers, where some of the SPs may choose to not even deploy ANDSF, and those that do deploy ANDSF may use different, non-uniform implementations. In addition, SP ANDSF policies are typically designed for their entire service area, and thus may not be aware of or crafted in sufficient detail for a specific enterprise or location. The SP-centric orientation of typically ANDSF implementations may therefore effectively prevent an "as is" use of ANDSF for enterprise-centric policies.

Figure 1:
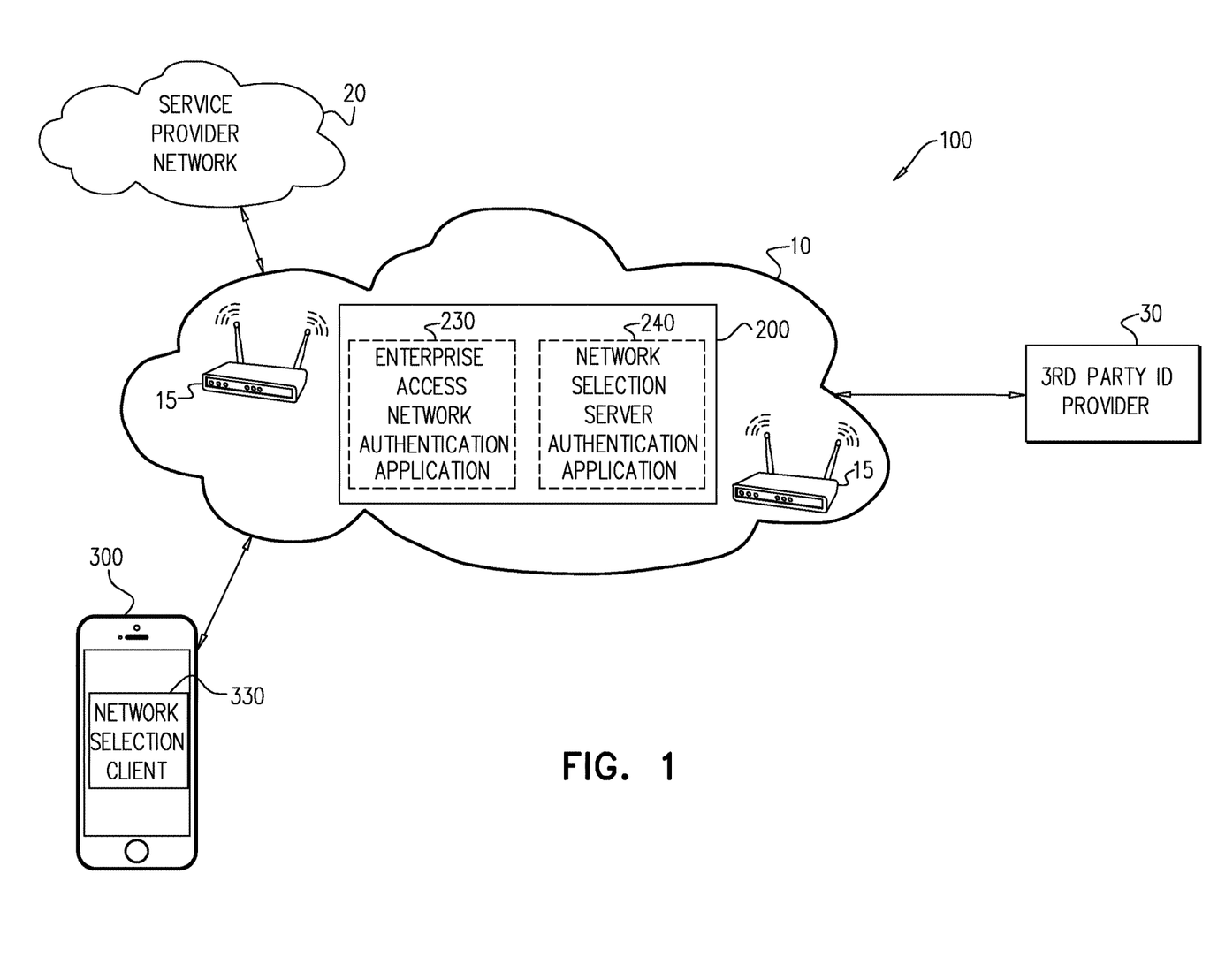
FIG. 1 is a partly pictorial, partly block illustration of an exemplary enterprise network access selection system, constructed and operative in accordance with embodiments described herein.

However, In accordance with embodiments described herein, ANDSF and/or similar functionality may provide a basis for implementing an enterprise-centric network selection policy. Reference is now made to FIG. 1 which is a partly pictorial, partly block illustration of an enterprise network access selection system 100, constructed and operative in accordance with embodiments described herein. System 100 comprises enterprise network 10, service provider network 20 and wireless device 300 (hereinafter also referred to as "device 300"). It will be appreciated that system 100 may provide connectivity for multiple instances of device 300; in the interests of clarity, only one wireless device 300 is shown in FIG. 1.

Enterprise network 10 comprises enterprise network selection server 200 (hereinafter also referred to as "server 200") and wireless access points (APs) 15. Wireless APs 15 may be of any suitable wireless technology for accessing enterprise network 10 from wireless device 300, such as, but not limited to, the WiFi Certified Passpoint standard for public-access WiFi that enables seamless roaming among WiFi networks and between WiFi and cellular networks. It will be appreciated that enterprise network 10 also comprises other devices such as application servers, personal computers, printers, physical access devices, etc. that may be connected either wirelessly via wireless APs 15 and/or via wired connections.

Enterprise network selection server 200 provides control plane functionality to enterprise network 10. It will be appreciated that server 200 may not necessarily be located physically within the premises of the enterprise associated with enterprise network. Server 200 may also be implemented remotely and connected to enterprise network via a communications network (e.g., the Internet) as part of a virtual private network (VPN) associated with enterprise network 10. Server 200 may also be implemented remotely as a cloud-based service.

Enterprise network selection server 200 comprises enterprise access network authentication application 230. Enterprise access network authentication application 230 is an application module that provides authentication onto enterprise network 10 (e.g., via HotSpot 2.0 or similar means on wireless APs 15). Enterprise network selection server 200 also comprises network selection server authentication application 240 which is an application module that provides authentication for the network selection functionality provided by server 200. In accordance with embodiments described herein, enterprise access network authentication application 230 and/or network selection server authentication application 240 may be implemented as integral components of server 200. However, it will be appreciated that enterprise access network authentication application 230 and/or network selection server authentication application 240 may alternatively be implemented as remote components located elsewhere in enterprise network 10 and accessed remotely by server 200 as needed. It will similarly be appreciated that enterprise access network authentication application 230 and/or network selection server authentication application 240 may implemented as cloud-based services.

As will be described in greater detail herein below, in operation, enterprise network selection server 200 may access a multiplicity of authentication services, including, for example:

An authentication service (not shown) for service provider network 20 (e.g., via Hotspot 2.0 or other suitable means). In accordance with embodiments described herein, server 200 may access the service provider network's authentication service either directly or through an intermediate identity brokering function hosted by enterprise network 10 and/or an intermediate entity.

Enterprise access network authentication 230 which provides authentication for enterprise network 10.

An authentication service (not shown) for third-party identity provider 30 which may be used, for example, to provide credentials and/or verify the identity of a guest user/device connecting to enterprise network 10. In accordance with some embodiments described herein, third-party identity provider 30 may be used to identify/verify/provide a guest's credentials instead of, or in addition to, the service provider network's authentication service. For example, third-party identity provider 30 may be a social media network, such as Facebook®, or a user account utility such as a Google Account.

Server 200 may use these authentication services to obtain additional information about wireless device 300 and/or its associated user. Such additional information may include, for example, but not limited to:

whether wireless device 300 has previously connected to enterprise network 10 (and already has a device profile, and whether that profile is current or needs updating);

whether the associated user is an employee of the enterprise associated with enterprise network 10, and if so what employee rank/status/entitlements may be associated with the user;

whether the associated user has a non-employee relationship with the enterprise (e.g., an employee of a partner business, a favored customer, a former employee, etc.);

whether the associated user has a user (and/or device) profile with third-party identity provider 30 (it will be appreciated that this information may not always be available);

whether the associated user is a guest; and/or device information (manufacturer, model, device or IoT function(s), device profile, etc.) associated with wireless device 300.

Wireless device 300 may comprise network selection client 330. Network selection client 330 may be a native component of the operating system (OS) on device 300, such as, but not limited to, a native implementation of an ANDSF client by the manufacturer or distributor of device 300. It will be appreciated, however, that it may be necessary to add extensions to native ANDSF client in order for it to provide support for the embodiments described herein. Alternatively, network selection client 330 may be a non-native client application provided by Enterprise network selection server 200 during a previous connection between device 300 and enterprise network 10.

Enterprise network selection server 200 may be operative to download network selection client 330 to wireless device 300 if network selection client 330 is not present on wireless device 300. Similarly, server 200 may be operative to download a device profile for network selection client 330 if one is not already present or if an existing device profile is outdated. The device profile may specify enterprise-specific policies to apply when device 300 connects to enterprise network 10. In accordance to some embodiments, the device profile may also be applied when connecting to a larger shared group or entity to which enterprise network 10 belongs. For example, enterprise network 10 may be associated with a branch of a retail chain; the device profile may be configured for use for other branches of the retail chain. Similarly, enterprise network 10 may be associated with a retail chain that shares a loyalty card with other retail chains; the device profile may be configured for use when visiting the other retail chains as well. In such a case, server 200 may be, for example, implemented in a cloud network in order to render it accessible from multiple locations.

The policies in the device profile may include references to identifiers and/or data related to enterprise network 10, (e.g., network identifiers, network state, etc.), as well as, or instead of, data directly obtainable from wireless device 300 (e.g., time, location, motion, RF signal strength, etc.). Then, while connected to enterprise network 10, wireless device 300 would then effectively follow enterprise-centric policies according to a local (i.e., on wireless device 300) device profile.

Figure 2:
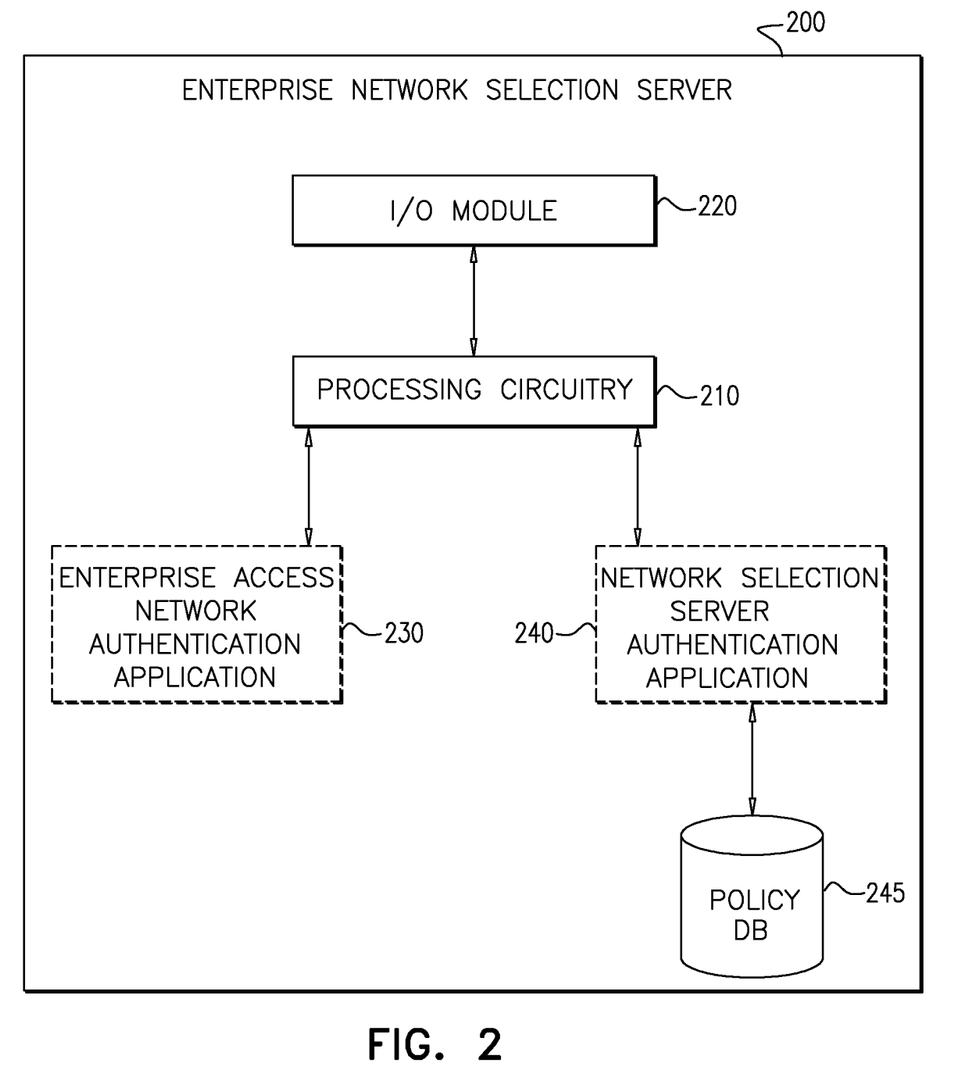
FIG. 2 is a block illustration of an exemplary enterprise network selection server from the system of FIG. 1.

Reference is now made to FIG. 2 which is a schematic illustration of an exemplary enterprise network selection server 200, configured and operative in accordance with embodiments described herein to at least facilitate the implementation of enterprise-centric network selection policies in wireless devices 300 (FIG. 1). Server 200 may be instantiated using any suitable computing device(s) that may support the embodiments as described herein. For example, server 200 may implemented using hardware, software, and/or firmware on a multi-purpose personal computer, computer tablet, or smartphone. Server 200 may also be implemented on a communications router or switch.

Server 200 comprises processing circuitry 210, input/output (I/O) module 220, enterprise access network authentication application 230, network selection server authentication application 240, and policy database 245. Enterprise access network authentication application 230, network selection server authentication application 240, and policy database 245 may be implemented using any suitable memory for storing software and/or operational data, such as an optical storage medium, a magnetic storage medium, an electronic storage medium, and/or a combination thereof. It will be appreciated that the memory, or parts thereof, may be implemented as a physical component of server 200 and/or as a physical component of one or more secondary devices in communication with server 200. It will also be appreciated that in the interests of clarity, while server 200 may comprise additional components and/or functionality, such additional components and/or functionality are not depicted in FIG. 2 and/or described herein. It will also be appreciated that the depiction of applications 230 and 240 as integral components of server 200 may be exemplary, in actual implementation, authentication functionality may be provided by one or more other servers.

Processing circuitry 210 may be operative to execute instructions stored in the memory. For example, processor 210 may be operative to execute enterprise access network authentication application 230 and/or network selection server authentication application 240. It will be appreciated that processing circuitry 210 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that server 200 may comprise more than one instance of processing circuitry 210. For example, one such instance of processing circuitry 210 may be a special purpose processor operative to execute enterprise access network authentication application 230 and/or network selection server authentication application 240 to perform some, or all, of the functionality of server 200 as discussed with respect to FIG. 1.

I/O module 220 may be any suitable software or hardware component such as a universal serial bus (USB) port, disk reader, modem or transceiver that may be operative to use protocols such as are known in the art to communicate either directly, or indirectly, with other elements of system 100 of FIG. 1, such as, for example, wireless access points 15, service provider network 20, third-party identity provider 30, and/or wireless device 300. For example, a mobility management entity (MME), a gateway, etc. over a communications network such as, for example, I/O module 220 may be operative to use some or all of Hotspot 2.0, Bluetooth, a backbone network, the Internet, etc. to connect to the other elements of system 100. It will be appreciated that in operation I/O module 220 may be implemented as a multiplicity of modules, where different modules may be operative to use different communication technologies.

It will also be appreciated that the embodiments described herein may also support configurations where some or all of the communications between I/O module 220 and elements of system 100 are brokered by a local server in enterprise network 10; at least some of the functionality attributed herein to server 200 may be also performed on such a local server. It will similarly be appreciated that since I/O module 220 is operative to communicate with the other elements of system 100, the physical location of server 200 may not necessarily be within close proximity of any specific element(s) of system 100.

Enterprise access network authentication application 230 and/or network selection server authentication application 240 may be applications implemented in hardware, firmware, or software that may be executed by processing circuitry 210 to at least provide the functionality of server 200 as described herein to enable enterprise-centric network selection by wireless devices 300.

Figure 3:
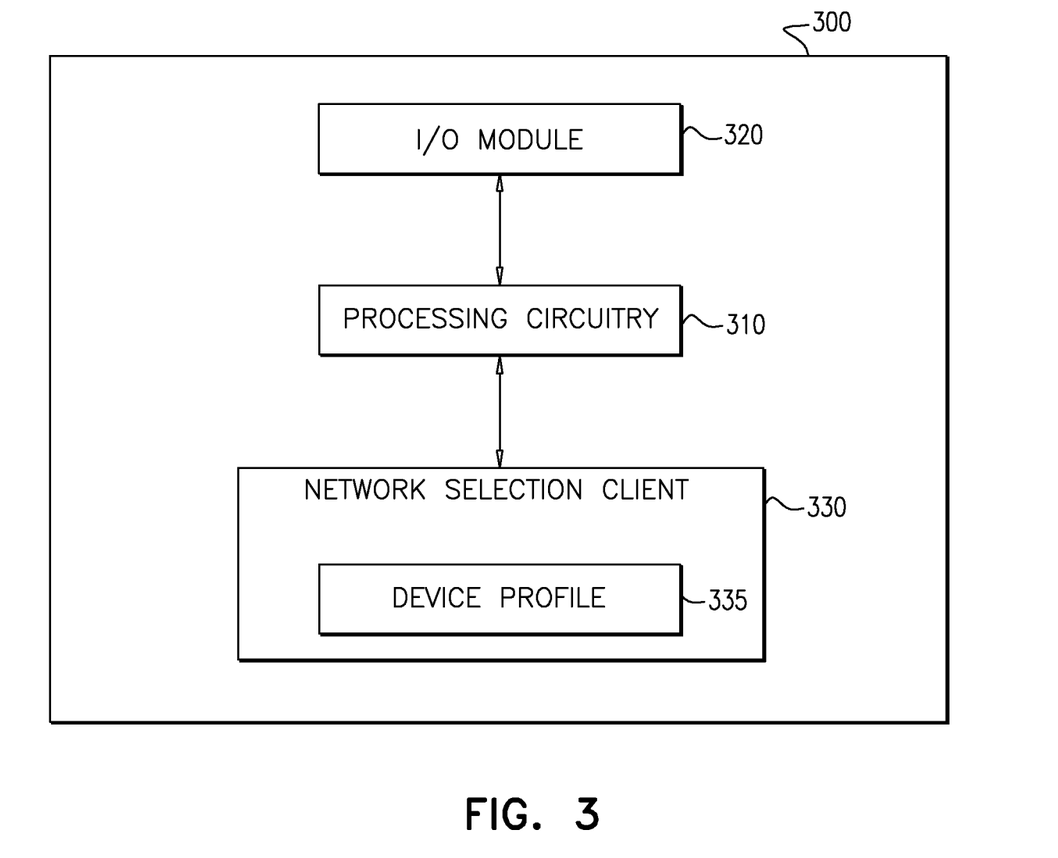
FIG. 3 is a block illustration of an exemplary wireless device from the system of FIG. 1.

Reference is now made to FIG. 3 which is a schematic illustration of an exemplary wireless device 300 from the system of FIG. 1, configured and operative in accordance with embodiments described herein to enable usage of enterprise-centric network selection policies when accessing enterprise network 10 (FIG. 1). Device 300 may be instantiated using any suitable computing device(s) that may support the embodiments as described herein. For example, device 300 may implemented using hardware, software, and/or firmware on a multi-purpose personal computer, computer tablet, or smartphone. Device 300 may also be implemented on a dedicated Internet of Things (IoT) device.

Device 300 comprises processing circuitry 310, input/output (I/O) module 320, and network selection client 330. Network selection client 330 may comprise device profile 335. Network selection client 330 may be implemented using any suitable memory for storing software and/or operational data, such as an optical storage medium, a magnetic storage medium, an electronic storage medium, and/or a combination thereof. It will be appreciated that the memory, or parts thereof, may be implemented as a physical component of device 300 and/or as a physical component of one or more secondary devices in communication with device 300. It will be appreciated that in the interests of clarity, while device 300 may comprise additional components and/or functionality, such additional components and/or functionality are not depicted in FIG. 3 and/or described herein.

Processing circuitry 310 may be operative to execute instructions stored in the memory. For example, processor 310 may be operative to execute network selection client 330. It will be appreciated that processing circuitry 310 may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits. It will similarly be appreciated that device 300 may comprise more than one instance of processing circuitry 310. For example, one such instance of processing circuitry 310 may be a special purpose processor operative to execute network selection client 330 to provide an enterprise-centric policy for accessing enterprise network 10 as discussed with respect to FIG. 1.

I/O module 320 may be any suitable software or hardware component such as a universal serial bus (USB) port, disk reader, modem or transceiver that may be operative to use protocols such as are known in the art to communicate either directly, or indirectly, with at least enterprise network 10 and/or service provider network 20. For example, I/O module 320 may be operative to use some or all of Hotspot 2.0, Bluetooth, a backbone network, the Internet, etc. to access elements of enterprise network 10 via wireless APs 15, and/or to access service provider network 20. It will be appreciated that in operation I/O module 320 may be implemented as a multiplicity of modules, where different modules may be operative to use different communication technologies.

It will also be appreciated that the embodiments described herein may also support configurations where some or all of the communications between I/O module 320 and elements of system 100 are brokered by a local server in enterprise network 10; at least some of the functionality attributed herein to device 300 may be also performed on such a local server.

In accordance with some embodiments described herein, network selection client 330 may be implemented as a native OS component (such as, for example, an ANDSF client) on device 300 that may be executed by processing circuitry 210 to use enterprise-centric network selection policies when accessing enterprise network 10. In accordance with other embodiments described herein, network selection client 330 may be a non-native application implemented in hardware, firmware, or software that that may be executed by processing circuitry 310 to use enterprise-centric network selection policies when accessing enterprise network 10.

It will be appreciated that when first accessing enterprise network 10, device 300 may not have an installed network selection client 330. If network selection client 330 is not already present in device 300—either natively (e.g., as part of the OS) or as a non-native application—device 300 may not be configured to use enterprise-centric network selection policies to access enterprise network 10 until network selection client 330 is installed in device 300. An SP, for example, may install an ANDSF client in devices supporting 3GPP functionality to function as network selection client 330. It will be appreciated that using an SP provided ANDSF client may be contingent on prior agreement with the SP's ANDSF client provider to customize the client to support enterprise access policies.

When device 300 lacks a native OS version of network selection client 330, there are a number of alternatives for installation of a non-native version. For example, for employees of the enterprise associated with enterprise network 10, a non-native version of network selection client 330 may be installed by "traditional means", e.g., software installation by the enterprise's information technology (IT) department, and/or by the user themselves, etc. It will be appreciated that network selection client may be integrated/embedded into other applications, such as, for example, an enterprise VPN client (such as Cisco AnyConnect) or a mobile device management (MDM) product.

For non-employees (e.g., guests and customers of the enterprise), there may be several options for downloading network selection client application 330 to device 300. For example, a QR code may be provided (e.g., at the entrance of the enterprise/business/venue, or via text message, email, instant messaging, etc.) that may be used to trigger the installation of an appropriate software client (e.g., appropriate to the device vendor, device model, device OS, OS release, etc.).

Network selection client application 330 may also be bundled as part of another application that may provide additional functionality and/or purpose for the enterprise or even a group of enterprises. Such an application may be downloaded from many sources, including the enterprise's website, etc. Such an application may be targeted at customers of the enterprise, for example providing additional services such as store directory, location-based functions (which may leverage the enterprise's wireless network and/or any location-based beacons, functions and/or services).

Figure 4:
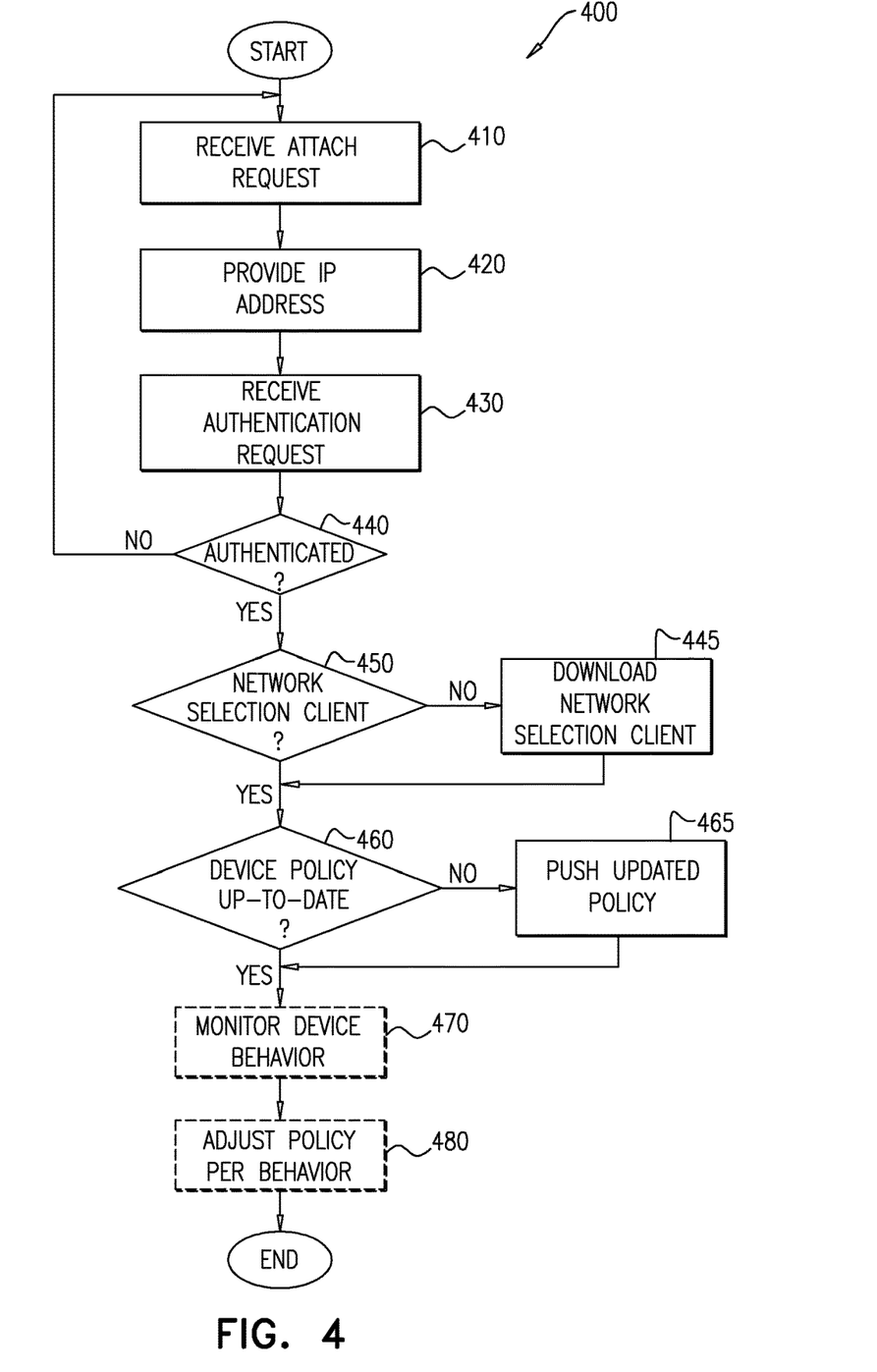
FIG. 4 is a flowchart of an exemplary authentication process to be performed by the enterprise network selection server of FIG. 2.

Reference is now made to FIG. 4 which is a high-level flow chart of an exemplary authentication process 400 to be performed by enterprise network selection server (FIG. 2), constructed and operative in accordance with embodiments described herein. Server 200 may receive (step 410) an attach request from wireless device 300 for enterprise network 10 using a current network selection policy for device 300, and in response provide (step 420) an IP address to the requesting device. It will be appreciated that the presentation of steps 410 and 420 as being performed by server 200 may be exemplary; in other embodiments, these steps may be performed by other elements of enterprise network 10, for example wireless APs 15.

Server 200 may receive (step 430) an authentication request from device 300 for enterprise network 10. Server 200 may invoke enterprise access network authentication application 230 (FIG. 2) to determine whether or not the authentication request was successful. The authentication request may comprise a credential that is significant to the enterprise (e.g., certificate), or a credential from an identity provider that the enterprise trusts, such as, for example, service provider 20 (FIG. 1) and/or third party identity provider 30 (FIG. 1). A representative list of examples of such credentials may include: onetime codes (e.g., as provided by an SMS text message), username/password combinations, media access control transparent auto login (MAC-TAL), generic bootstrapping architecture (GBA), secure remote password protocol (SPR), external databases (e.g., home subscribe server (HSS), lightweight directory access protocol (LDAP)), X509 certificates, etc. When authenticating with a device subscriber identity module (SIM) (e.g., from service provider network 20), extensible authentication protocol-authentication and key agreement (EAP-AKA) authentication may also be used.

If the request was not authenticated (step 440), access is refused to device 300 and process control may return the start of process 400.

If the request was authenticated (step 440) server 200 may invoke network selection server authentication application 240 to determine if network selection client application 330 is enabled on device 300 (step 450). For example, application 240 may request a confirmation response from network selection client application 330 on device 300. If a response is not received, it may be assumed that there is no client application on the device.

Network selection server authentication application 240 may download (step 455) a network selection client for installation to device 300 if necessary. It will be appreciated that step 455 may include a dialogue with device 300 requesting additional information regarding the device's configuration (i.e., in order provide a compatible client application) and/or requests for user confirmation of the download and installation.

Network selection server authentication application 240 may also check whether or not the policies on the device are up-to-date. If the device policies are not up-to-date (step 460), Network selection server authentication application 240 may push (step 465) an updated policy to device 300. It will be appreciated that application 240 may access default, individual, and/or group policies from policy database 245 (FIG. 2) to perform step 465.

It will be appreciated that a user's policies may be refined based upon measurements of the user's and/or the network's prior behavior. In accordance with some embodiments described herein, server 200 may monitor (step 470) network access behavior by device 300. For example, measurement data may be collected via a number of techniques, including: from data gathered in the wireless APs 15; from network elements or functions (e.g., routers, gateways, etc.); from explicit measurement agents (e.g., deep packet inspection); from end point or application servers; and/or from applications or software shims in device 300. It will be appreciated that depending on the implementation of process 400, step 470 may include use of all such data gathering means, a subset of such means, or even a statistical subset or sample of such means.

It will be appreciated that using the data gathered in step 470, relevant trends and correlations may be observed, as well as inferences may be made regarding a correct response to certain situations. From these, inferences can be drawn for improving or optimizing the response to future events and situations. Algorithms such as dynamic feedback and/or machine learning algorithms may then be used to adjust (step 480) policies per analysis of the observed behavior. Policies may also be modified proactively, to address known events or anticipated changes in the enterprise's environment, network conditions, etc.

Figure 5:
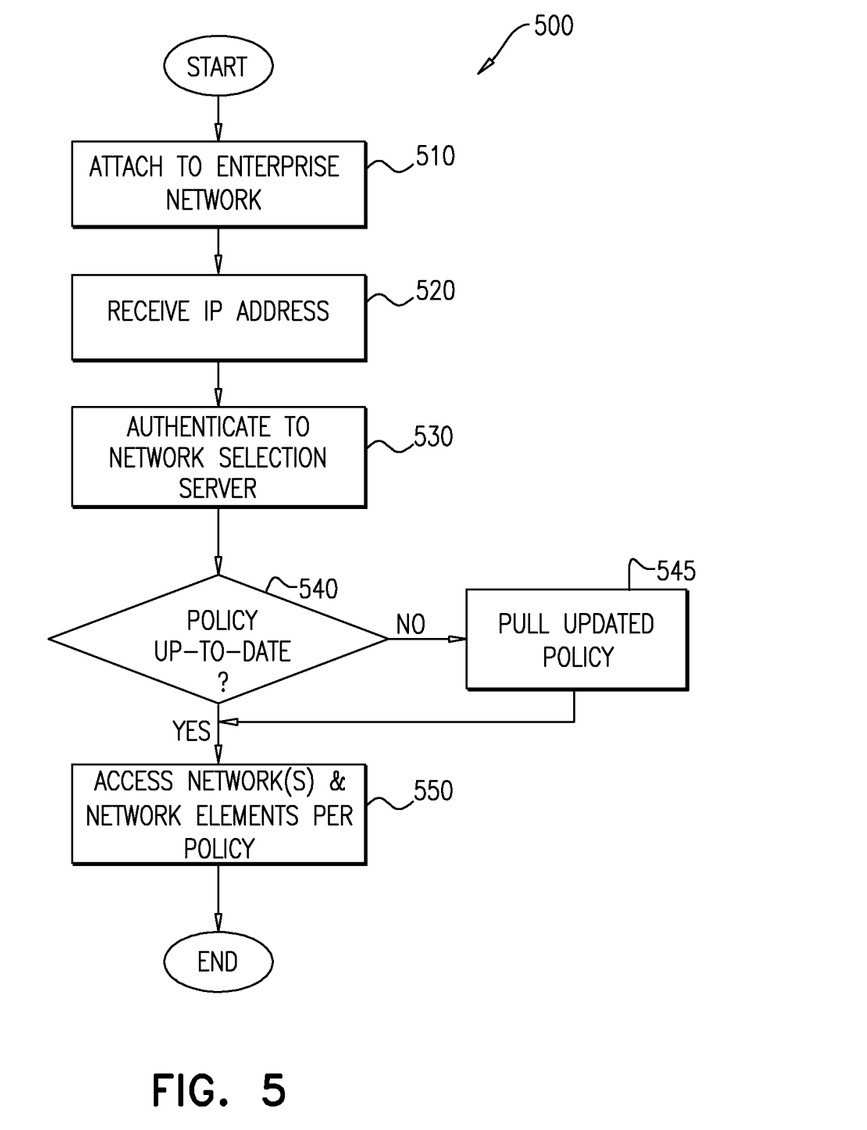
FIG. 5 is a flowchart of an exemplary authentication and network selection process to be performed by the wireless device of FIG. 3.

Reference is now made to FIG. 5 which is a high-level flowchart of an exemplary authentication and network selection process 500 to be performed by wireless device 300 (FIG. 3) as already configured with network selection client application 330.

Device 300 may attach (step 510) to enterprise network 10 via I/O module 320 and receive (step 520) an IP address after attaching. Device 300 may then invoke network selection client application 330 to authenticate (step 530) to server 200 in accordance with the policies provided by device profile 335.

If, per an exchange with server 200, the policy in device profile 355 is not up-to-date (step 540), network selection client application 330 may pull (step 545) an updated policy from server 200.

While still connected to enterprise network 10, device 300 may access (step 550) elements of enterprise network 10 according to the current policy in device profile 335.

Figure 6:
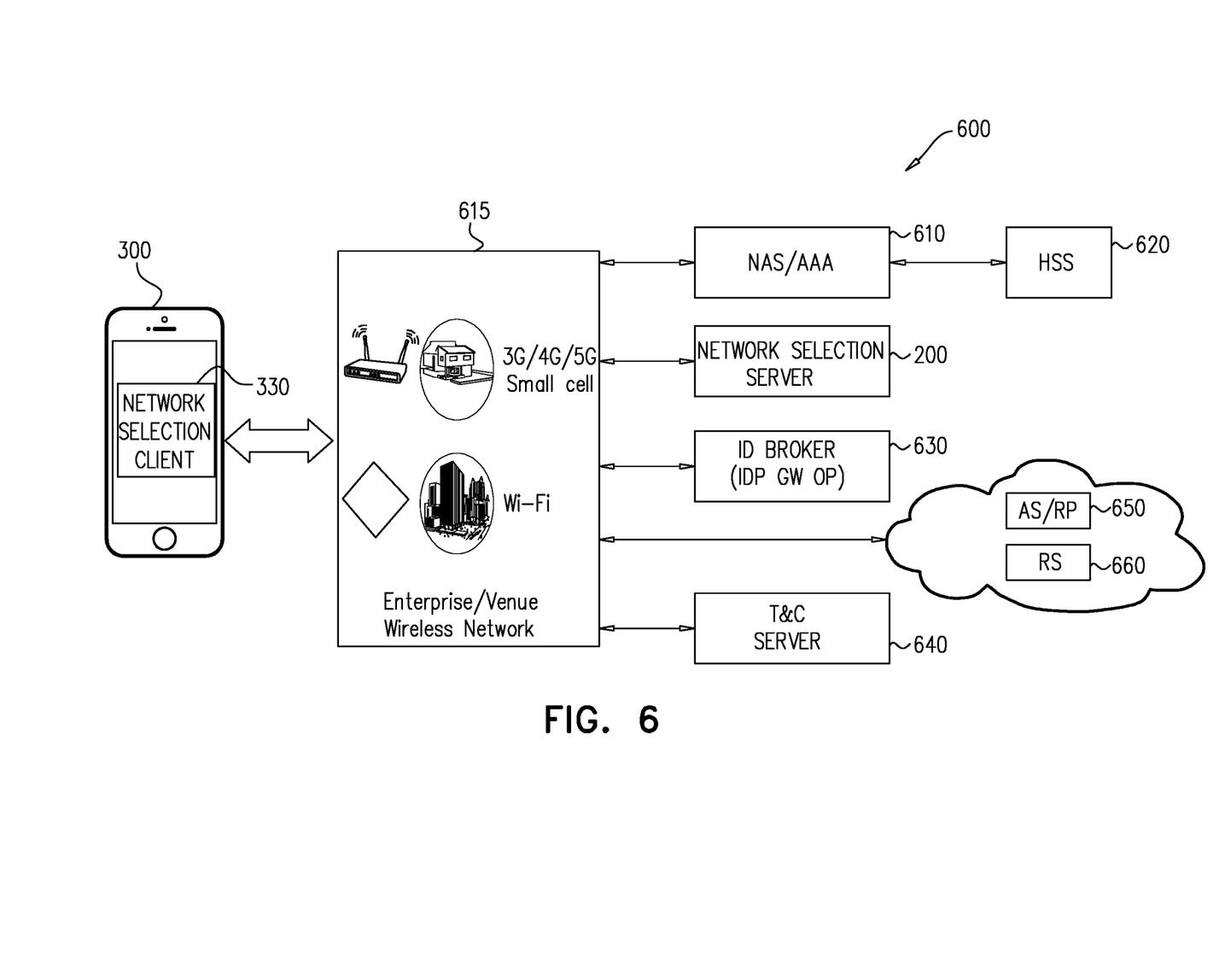
FIG. 6 is a partly pictorial, partly block illustration of another exemplary enterprise network access selection system, constructed and operative in accordance with embodiments described herein.

Reference is now made to FIG. 6 which is a partly pictorial, partly block illustration of exemplary enterprise network access selection system 600, constructed and operative in accordance with embodiments described herein. System 600 may comprise several components that may be generally similar to like-numbered components of system 100 (FIG. 1). For example, network selection server 200, UE 300 and network selection client 330 may be generally similar to enterprise network selection server 200, wireless device 300 and network selection client 330 as depicted in FIG. 1. System 600 may also comprise network authentication server (NAS) 610, enterprise wireless infrastructure 615, home subscribe server (HSS) 620, ID broker 630, terms and conditions (T&C) server 640, application server/resource provider (AS/RP) 650, and resource (RS) 660. Enterprise wireless infrastructure 615 comprises one or more APs generally similar to APs 15 (FIG. 1) as well as one or more mobile cell antennae from a least one mobile service provider. It will be appreciated that the functionality attributed herein to NAS 610, HSS 620, ID broker 630, T&C server 640, AS/RP 650, and/or RS 660 may be implemented on one or more computing devices comprising processing circuitry and memory that may be suitable for providing such functionality. In accordance with embodiments described herein, ID broker 630 may be implemented using identity provider openID gateway (IdP GW OP).

Figure 7A:
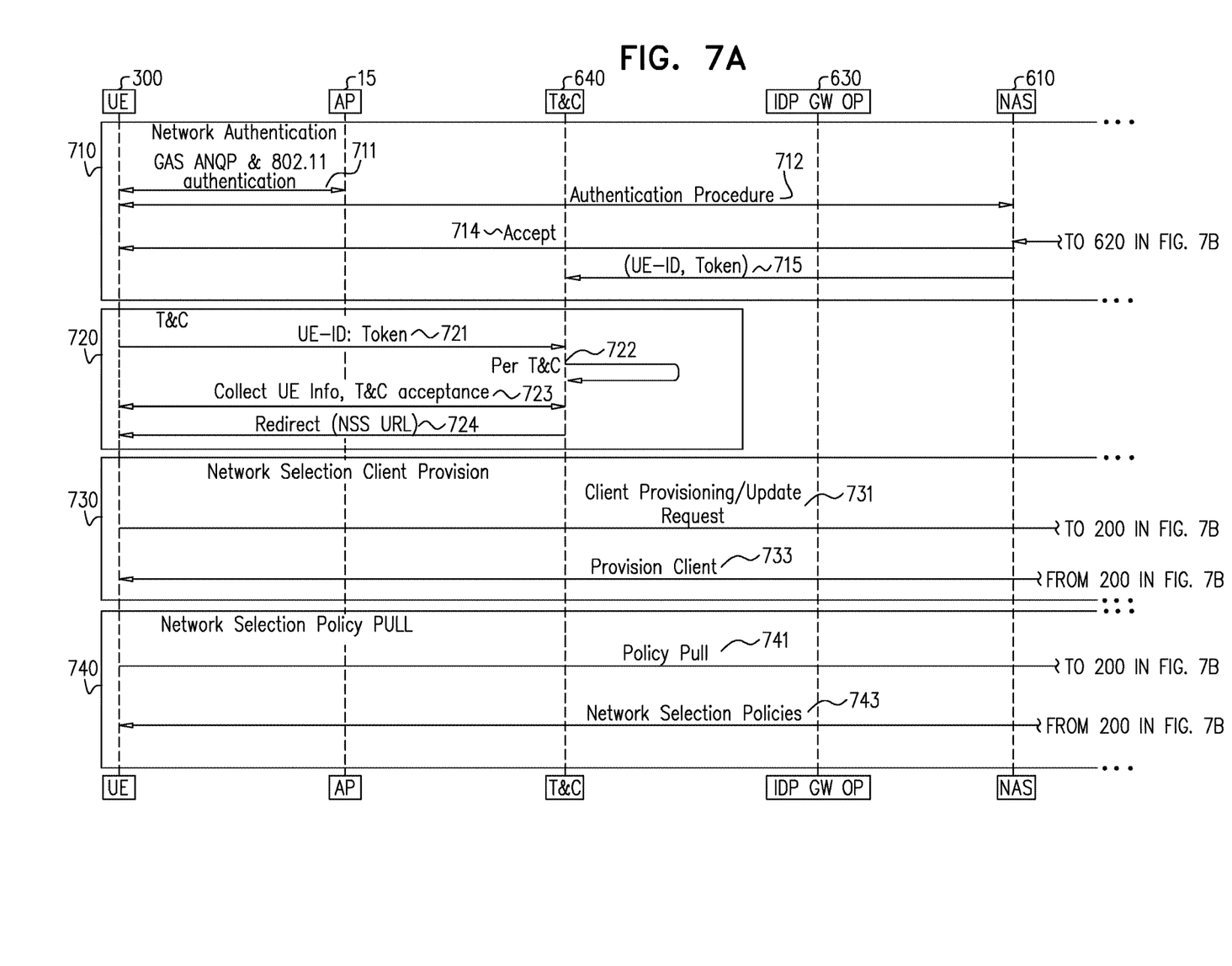
FIGS. 7A, 7B, 8A, and 8B are illustrations of a process flow in the system of FIG. 6.
Figure 7B:
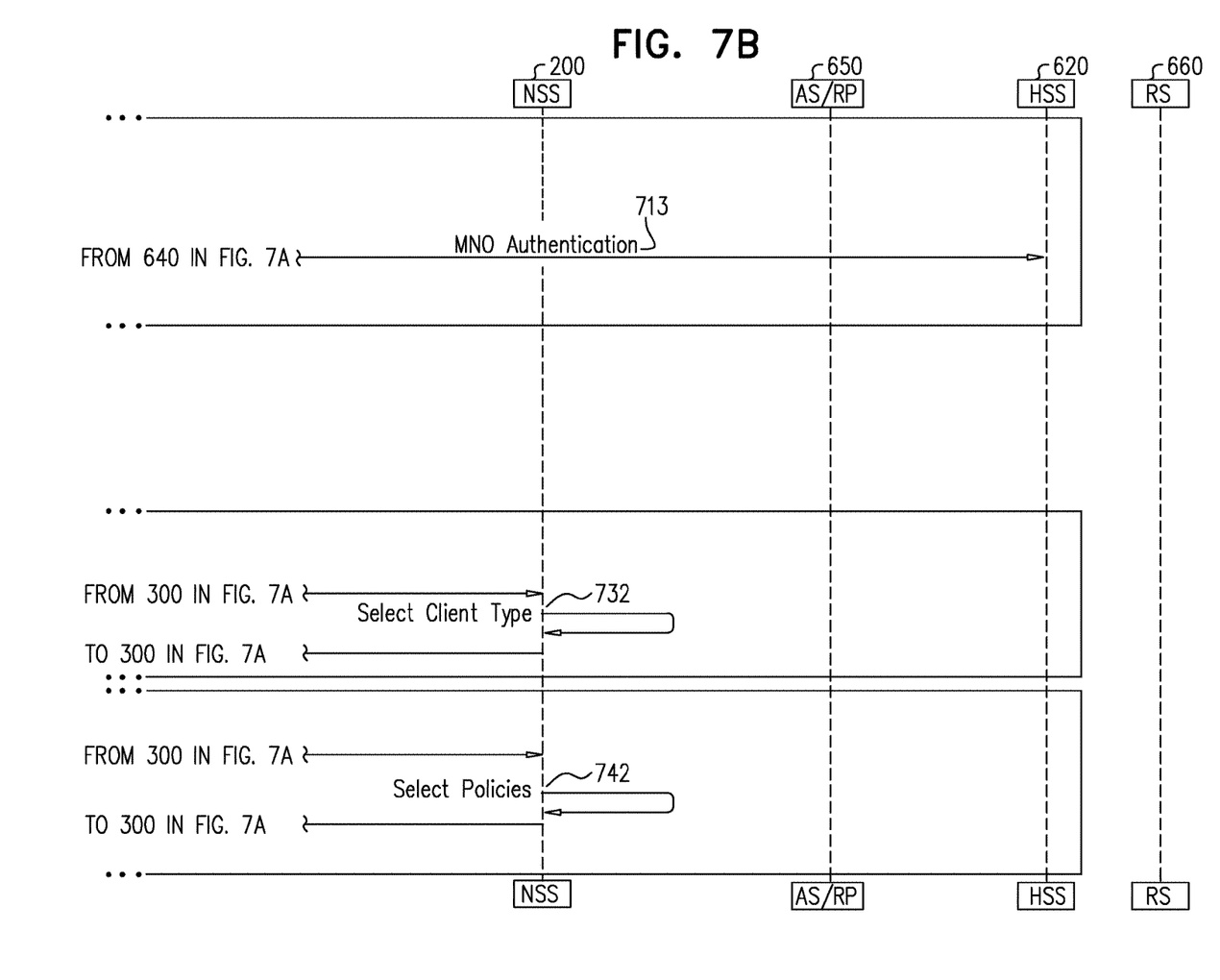

Reference is now made to FIGS. 7A, 7B, 8A, and 8B which together illustrate an exemplary process flow 700 for system 600 in accordance with embodiments described herein. As depicted in FIGS. 7A and 7B, process flow 700 may comprise the following sub-processes: network authentication 710, T&C 720, network selection client provision 730, network selection policy pull 740, access to enterprise services 750, and network selection policy push 770.

Network authentication 710 may begin with Generic Advertisement Service (GAS) Access Network Query Protocol (ANQP) and authentication IEEE 802.11 authentication (step 711), where UE 300 authenticates itself for the purposes of connecting to AP 15. Once step 711 has completed, UE 300 may initiate an authentication procedure (step 712) opposite NAS 610, e.g., providing (via AP 15) SIM-based credentials for authentication by a mobile network operator (MNO). NAS 610 may then use the credentials to authenticate UE 300 opposite HSS 620 (step 713), such that NAS 610 may effectively broker authentication of UE 300 by HSS 620. Once UE 300 has been authenticated by HSS 620, NAS 610 may provide UE 300 with a token indicating successful authentication and redirect UE 300 to T&C server 640 (step 714). NAS 610 may also provide a token and a UE identifier (UE-ID) associated with UE 300 to T&C server 640 (step 715).

T&C 720 may begin with UE 300 providing an associated UE-ID and the token received from NAS 610 to T&C server 640 (step 721). T&C Server 640 may verify the UE-ID and token against the UE-ID and token received from NAS 610 and proceed per the relevant terms and conditions (step 722). For example, different enterprise partners may have different terms and conditions for accessing the enterprise. T&C server 640 may then collect additional information from UE 300 in order to establish acceptance of the terms and conditions by UE 300 (step 723). T&C server 640 may then provide a URL to UE 300 in order to redirect UE 300 to NSS 200 (step 724).

Network selection client provision 730 may begin with UE 300 providing a network selection client provisioning/update request to NSS 200 (step 731). NSS 200 may then select a network selection client type for UE 300 based on factors associated with UE 300 (step 732). For example, the network selection client type may be selected based on a type of device and/or a user profile associated with UE 300. NSS may then provision UE 300 with the selected network selection client, e.g., network selection client 330 from FIG. 6 (step 733). It will be appreciated that in some cases, UE 300 may already have an installed client application that may be updated in step 733. Similarly, in some cases, UE 300 may already have an up-to-date client application. In such cases step 733 may not be performed.

Once the network selection client has been provisioned/updated on UE 300, network selection policy pull 740 may begin with UE 300 pulling a network selection policy from NSS 200 (step 741). NSS 200 may select one or more appropriate network selection policies for UE 300 (step 742) based on, for example, the associated network selection client type and/or other information specific to UE 300. NSS 200 may then provide the selected network selection policies to UE 300 (step 743).

Figure 8A:
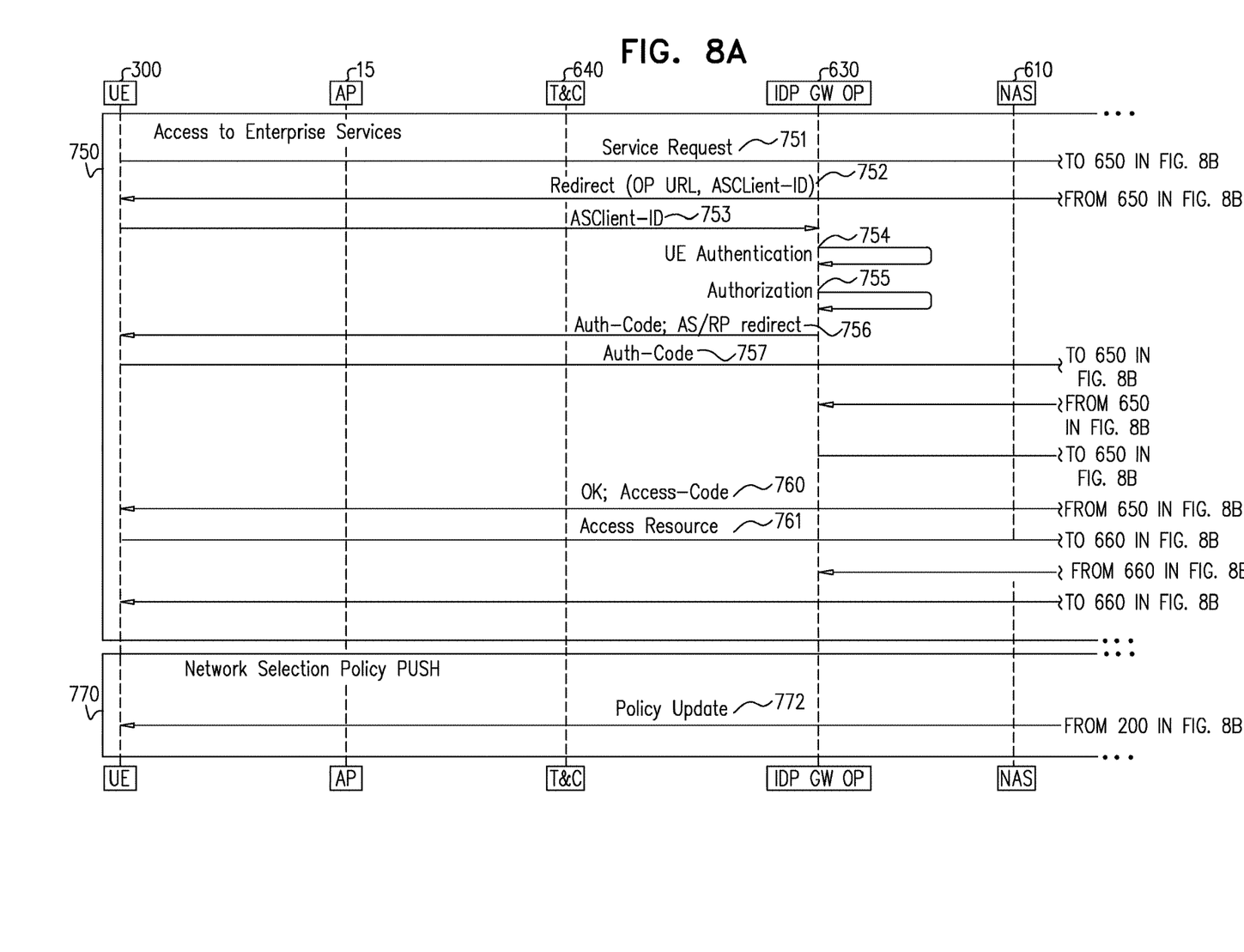

UE 300 may then begin access to enterprise services 750 by sending a service request (step 751) to AS/RP 650. The service request may include the UE-ID and/or an application identifier to be used by AS/RP 650 to redirect UE 300 to IDP GW OP 630 (step 752), where AS/RP 650 may send UE 300 an application identifier (ASClient-ID) and a URL for IDP GW OP 630. UE 300 may then forward the ASClient-ID to IDP GW OP 630 (step 753). IDP GW OP 630 may then perform application layer authentication for UE 300 (step 754), Using, for example, known authentication methods, such as, for example, GBA-based authentication. IDP GW OP 630 may then perform authorization of use for ASClient-ID by UE 300 (step 755) in line with enterprise policies for the indicated application vis-à-vis the requesting UE 300.

Once IDP GW OP 630 has authorized UE 300 to access the requested application, it may provide an authorization code (Auth-Code) to UE 300 and redirect it to AS/RP 650 (step 756). UE 300 may then send the authorization code to AS/RP 650 (step 757), which in turn may forward the received authorization code to IDP GW OP 630 (step 758). IDP GW OP 630 may then forward an ID-token and Access-Code to AS/RP 650 (step 759) to "unlock" the requested enterprise service (as per the service request of step 751).

Figure 8B:
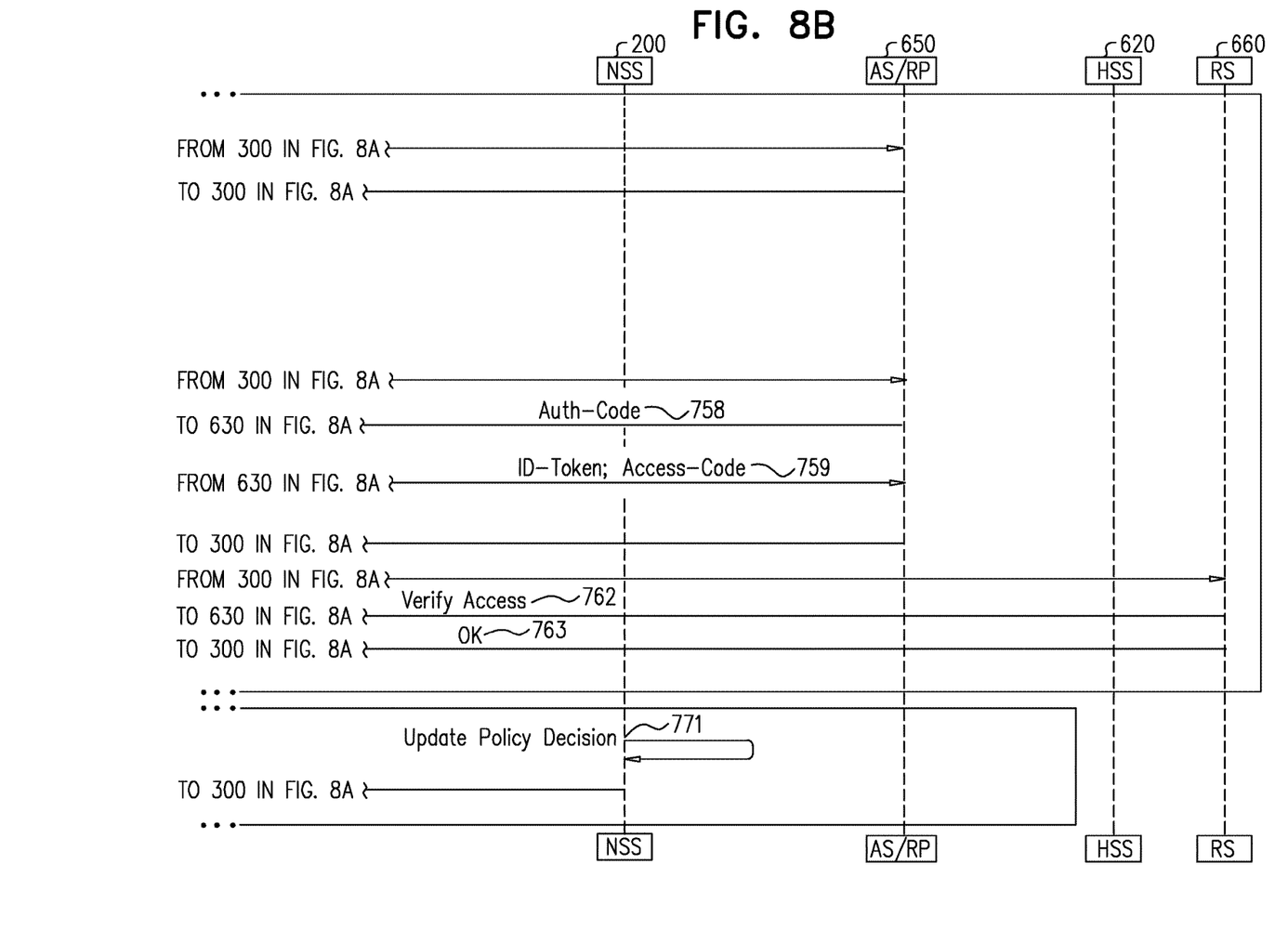

AS/RP 650 may then "OK" the requested enterprise service (step 760) by providing the Access-Code to UE 300. UE 300 may then access a resource associated with the service request by sending the Access-Code to RS 660 (step 761). RS 660 may use the received Access-Code to verify access (opposite IDP GW OP 630) by UE 300 (step 762).

It will be appreciated that from time-to-time NSS 200 may update the policies for UE 300, either directly, or as part of a group update for user-based policies and/or device-based policies. NSS 200 may push such a policy update to UE 300 in network selection policy push 770. Network selection policy push 770 may begin with NSS 200 performing update policy decisions (step 771) in accordance with user-based and/or device-based criteria. NSS 200 may then push one or more policy updates to UE 300 (step 772).

It will be appreciated that an enterprise network implementation (e.g., enterprise network 10) is typically much smaller (or more local) than a service provider's service area (e.g., service provider network 20). By way of example, the enterprise network implementation may extend throughout a building, or a campus; whereas a service provider's service area may be a city, a region, or a country. Furthermore, an enterprise may also has access to additional information specific to its private location, building and/or network, which a service provider or a device cannot access. Hence it is much easier for the enterprise to more narrowly optimize the device's policies for performance specific to the local environment, as well as with regard to other aspects including the specifics of the device OS. Such optimizations may even be done on a static or dynamic basis, and may even be highly local in nature, using additional device data such as location data from other sources beyond GPS (e.g., such as beacons for tightly controlled lab-specific access policies), actions that the user is taking on the device, etc.

The following represents an exemplary listing of access selection policies that may be used individually and/or in combination for wireless devices 300 in system 100:
- Location-based and/or location-triggered access (e.g., latitude/longitude, elevation or building floor, network ID, location or near-field beacons, location inferred from network or device basis, etc.)
- Time-based access
- Access prioritization on a per user/application/flow basis
- Access selection of policies based upon RF link and network conditions (near, far, strong, weak, RTT, etc.)
- Network and/or access point conditions (e.g., network or AP load, number of users, congestion, throughput, etc.)
- User/device, application, or flow
- User/device state-, context- or action-based (e.g., while making a purchase, etc.)
- Quality of service (as determined according to device or network functions, e.g., quality of experience (QoE), differentiated services code point (DSCP), packet marking, etc.)

Business/location state: e.g., normal conditions, business open vs closed, emergency, etc.

Access aggregation/differentiation, where some user applications/flows may be directed to different access technologies, and/or some devices may be allowed concurrent connections via multiple service set identifiers (SSIDs), etc.)

Access security state (encrypted, non-encrypted, level of security, etc.)

Server-triggered or policy push

Access point manufacturer

Device type: device manufacturer, model, OS release, smartphone, IoT "thing", etc.

Device state (e.g., battery level, number/type of applications in use, total throughput, etc.)

User/device velocity, motion, acceleration, etc.

Business owner preferences

It will be appreciated that while systems 100/600 may facilitate enterprise-centric network selection policies, an installed network selection client application 330 may not necessarily be restricted to serving a single enterprise. Depending upon the implementation of network selection client application 330 and/or the storage space allocated to policy database 245, application 330 may be "shared" by multiple enterprises, each with its own set of policies stored in policy database.

It is appreciated that software components of the embodiments of the disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the disclosure.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable subcombination.

It will be appreciated by persons skilled in the art that the embodiments of the disclosure are not limited by what has been particularly shown and described hereinabove. Rather the scope of the embodiments of the disclosure is defined by the appended claims and equivalents thereof:

What is claimed is:

1. An enterprise network comprising:
   at least one wireless access point operative to enable a wireless device to connect to said enterprise network;
   networked resources to be accessed by said wireless device; and
   a network selection server implemented on at least one computing device and operative to:
      authenticate credentials provided by said wireless device when connecting to said enterprise network via said at least one wireless access point;
      provide network access selection policies to said wireless device, wherein said network access selection policies at least determine access by said wireless device to said networked resources while said wireless device is connected to said enterprise network;
      monitor said access of said networked resources by said wireless device;
      update said network access selection policies based on monitoring of said access; and
      autonomously push an updated version of said network access selection policies to said wireless device.

2. The enterprise network according to claim 1 wherein said network access selection policies also determine a technology to be used by said wireless device to connect to said enterprise network.

3. The enterprise network according to claim 1 wherein said network selection server is further operative to:
   determine whether a network selection client application is present on said wireless device; and
   upon determining that said network selection client application is not present on said wireless device, pushing an installable version of said network selection client application to said wireless device.

4. The enterprise network according to claim 3 wherein said network selection client application is an application native to an operating system (OS) of said wireless device.

5. The enterprise network according to claim 4 wherein said network selection client application is an access network discovery and selection function (ANDSF) client.

6. The enterprise network according to claim 3 wherein said installable version of said network selection client application is not native to an operating system (OS) of said wireless device.

7. The enterprise network according to claim 3 wherein said network selection server is further operative to:
   determine whether said network selection client application has an up-to-date network access selection policy for said wireless device to access said networked resources; and
   upon determining that said network access selection policy is not up-to-date, pushing an updated version of said network access selection policy to said wireless device.

8. The enterprise network according to claim 1 wherein said network selection server is further operative to:
   access a service provider network to authenticate said credentials provided by said wireless device, wherein said credentials provided by said wireless device are SIM-based.

9. The enterprise network according to claim 1 wherein said network selection server is further operative to:
   access a third-party identity provider to authenticate said credentials provided by said wireless device.

10. A wireless device comprising:
    processing circuitry;
    at least one input/output (I/O) module operative to connect said wireless device to at least one mobile service provider network and at least one enterprise network; and
    a network selection client application operative to be executed by said processing circuitry to employ an enterprise-centric network access selection policy when said wireless device accesses said at least one enterprise network, wherein said enterprise-centric network access selection policy is adjusted based on one or more networked resources of the at least one enterprise network determined to be accessed by said wireless device and an updated version of said enterprise-centric network access selection policy is autonomously pushed to said wireless device.

11. The wireless device according to claim 10 wherein said network selection client application is configured to support access of at least two enterprise networks, wherein said network selection client application employs a different version of said enterprise-centric network access selection policy for each of said at least two enterprise networks.

12. The wireless device according to claim 10 wherein said network selection client application is implemented as a native operating system (OS) access network discovery and selection function (ANDSF) client.

13. The wireless device according to claim 10 wherein said network selection client application is a non-native OS client application.

14. The wireless device according to claim 10 wherein said network selection client application is operative to use said at least one I/O module to pull said enterprise-centric network access selection policy from said at least one enterprise network.

15. A method implemented in an enterprise network, the method comprising:
  receiving an authentication request from a device operating as user equipment (UE);
  brokering authentication of said UE opposite a mobile network operator;
  providing at least one network selection policy to said UE, wherein said at least one network selection policy indicates at least one policy for said UE to use at least one networked resource in said enterprise network;
  providing said UE with access to said at least one networked resource in accordance with said at least one network selection policy;
  monitoring said access of said at least one networked resource by said UE;
  updating said at least one network selection policy based on said monitoring; and
  autonomously pushing an updated version of said at least one network selection policy to said UE.

16. The method according to claim 15 and further comprising:
  providing a network selection client for installation on said UE wherein said network selection client is operative to provide access to said at least one networked resource according to said at least one network selection policy.

17. The method according to claim 16 and further comprising:
  selecting said network selection client in accordance with at least one of a device type for said UE or a user profile for a user associated with said UE.

18. The method according to claim 15 wherein:
  said providing at least one network selection policy to said UE is in response to a request from said UE to receive said at least one network selection policy.

19. The method according to claim 15, further comprising:
  determining whether a network selection client application is present on said UE; and
  upon determining that said network selection client application is not present on said UE, pushing an installable version of said network selection client application to said UE.

20. The method according to claim 15, further comprising:
  determining whether a network selection client application on said UE has an up-to-date network access selection policy for said UE to access said at least one networked resource; and
  upon determining that said network access selection policy is not up-to-date, pushing an updated version of said network access selection policy to said UE.

* * * * *